United States Patent [19]

Nonnenmacher

[11] Patent Number: 5,408,402

[45] Date of Patent: Apr. 18, 1995

[54] CLOCK-CONTROLLED FREQUENCY CONVERTER HAVING CURRENT LIMITATION

[75] Inventor: Ulrich Nonnenmacher, Gauting, Germany

[73] Assignee: Siemens Aktiengesellschaft, Munich, Germany

[21] Appl. No.: 101,670

[22] Filed: Aug. 3, 1993

Related U.S. Application Data

[63] Continuation of Ser. No. 830,911, Feb. 4, 1992, abandoned.

[30] Foreign Application Priority Data

Feb. 15, 1991 [EP] European Pat. Off. ............ 91102195

[51] Int. Cl.⁶ .......................................... H02M 3/335
[52] U.S. Cl. .................................... 363/21; 363/56; 363/97
[58] Field of Search .................... 363/20, 21, 56, 97, 363/131; 323/288; 307/265; H02M 3/335

[56] References Cited

U.S. PATENT DOCUMENTS

| | | | |
|---|---|---|---|
| 4,706,176 | 11/1987 | Kettschau | 363/21 |
| 4,772,995 | 9/1988 | Gautherin et al. | 363/21 |
| 4,849,869 | 7/1989 | Tanuma et al. | 363/21 |
| 4,951,186 | 8/1990 | Brakus et al. | 363/21 |

FOREIGN PATENT DOCUMENTS

| | | | |
|---|---|---|---|
| 0404993A1 | 1/1991 | European Pat. Off. | H02M 3/335 |
| 2388009 | 8/1978 | Germany | H02H 9/02 |
| 0016756 | 10/1991 | WIPO | H02M 3/335 |

*Primary Examiner*—Steven L. Stephan
*Assistant Examiner*—Adolf Berhane
*Attorney, Agent, or Firm*—Hill, Steadman & Simpson

[57] ABSTRACT

A clock-controlled frequency converter has a device for current limitation operating on the basis of chronological shortening of turn-on pulses and a further device for current limitation. As a result of the further current limitation device, the frequency converter manages without omitting turn-on pulses since the switching frequency of the frequency converter is diminished. The frequency converter can be advantageously employed in a clocked commercial lines-operated and battery-operated devices.

11 Claims, 4 Drawing Sheets

VOLTAGE-
CONTROLLED
OSCILLATOR

CONTROL
CIRCUIT

CLOCK-CONTROLLED FREQUENCY CONVERTER HAVING CURRENT LIMITATION

This is a continuation of application Ser. No. 07/830,911, filed Feb. 4, 1992, now abandoned.

BACKGROUND OF THE INVENTION

1. Field of the Invention

The present invention is related to an autoconverter which is a clock-control frequency converter that is supplied with an input voltage from a DC voltage source and comprising at least one transistor that can be switched on and off by turn-on pulses of a control circuit in the timing of a switching frequency and comprising a device for current limitation which operates on the basis of current-dependent, chronological shortening of the turn-on pulses, and comprising a further device for further limitation that is effective in an upper range of the current to be limited.

A converter of the type set forth above is already known from the German application B1 28 38 009. In this known converter, a power switching transistor is driven with turn-on pulses of constant working frequency by a clock generator. For controlling the output voltage, the pulse duty factor, i.e. the quotient of the on time of the power switching transistor relative to the cycle duration, is varied. Given an overload at the output of the autoconverter, the current in the power circuit is limited for protecting the components. This is achieved by shortening the on time. The switching transistor is thereby inhibited with the assistance of an aremeter circuit as soon as the measured, momentary value of the currents flowing through the switching transistor exceed a given limit value.

Since the limited switching speed of the switching transistor and the operating times of the measurement and control circuit cause a minimum on time, and this minimum on time would require an economically-unjustifiable over-dimensioning of the components of the power circuit in case of a short circuit, a further arememeter circuit engages in the known converter if the minimum on time of the switching transistor must be downwardly transgressed. In the known converter, this occurs when the voltage at the working impedance of a current transformer has therefore risen by more than the threshold voltage of a diode. This additional action, repeated as necessary, introduces switching pauses having the duration of a plurality of cycles, so that the current in the power circuit does not rise above a prescribed limit. A farther-reaching current limitation can be achieved in this manner. However, the second measuring circuit is only activated after the current has risen to a value that lies clearly above the limit value of the first measurement circuit.

In a current limitation on the basis of omitting individual turn-on pulses, periodic whistling noises and/or operating conditions can occur over and above this wherein the converter continuously oscillates between two operating points. Furthermore, difficulties in a defined function of such a current limitation can result in that a plurality of tolerances are relevant for the function, namely tolerances of the comparator of the second stage, tolerances of the diode threshold voltage, tolerances of the reference, temperature response of the evaluation circuit and a scatter of the plurality of suppressed pulses.

Given high-performance apparatus with a low internal resistance or given apparatus having a comparatively-high output voltage, this minimum on time in the short at the output side can result in an output current that lies clearly above the desired reference value and therefore inadmissibly loads the components in the output circuit.

SUMMARY OF THE INVENTION

An object of the present invention, therefore, is to provide an autoconverter of the type set forth above such that the current limitation does not require any evaluation of the current above the response value of a first current-limiting stage, this response value being the determining factor for the variation of the pulse duty ratio in the range of comparatively-high pulse duty ratios and thereby managing without an omission of turn-on pulses.

The above object is achieved, according to the present invention, in an autoconverter that is constructed in the manner set forth above comprising a clock-control frequency converter that is supplied with an input voltage from a DC source, at least one transistor that can be switched on and off by turn-on pulses of a control circuit in the timing of a switching frequency and a device for current limitation operating on the basis of current-dependent, chronological shortening of the turn-on pulses and a further device for current limitation that is effective in an upper range of the current to be limited. The input voltage of the converter can thereby be the voltage of a battery or can be acquired by rectification of an alternating voltage. The output voltage or voltages of the rectifier can be DC voltages and/or AC voltages. The output DC voltage that controls the further apparatus for current limitation can be the voltage feeding a load or can be an image of this voltage, whereby a rectification of the voltage is to be provided in the case of a DC-AC converter. The reduction of the switching frequency can occur continuously or in steps.

As a result of these measures, a converter advantageously results having a further current limitation on the basis of a defined lowering of the switching frequency in an operating condition wherein the current limitation has not yet been negatively affected by switching times of the switching transistor or of the control circuit.

In accordance with a particular feature and development of the invention, the clock-control frequency converter, in particular an autoconverter, is characterized in that the frequency converter is a DC-DC converter, and in that the output DC voltage of the frequency converter controlling the further device for current limitation provides at least an image of the output DC voltage feeding the load. The DC output voltage of the converter that controls tile further device for current limitation can be the output voltage of the primary circuit at the output side or an additional output circuit. In the case of a plurality of output circuits, it is advantageously assured, with the assistance of an EMF voltage, that the output DC voltage that is employed for controlling the apparatus for further current limitation provides an image of the output DC voltage that supplies the load.

In accordance with another feature and development of the invention, the converter set forth above is particularly further characterized in that the control circuit is supplied via a voltage regulator from the input voltage of the frequency converter and is also supplied with a feedback voltage by way of a decoupling diode, and that the output DC voltage controlling the further device for current limitation is the feedback voltage circuit. The further means for current limitation is therefore supplied with a feedback voltage. In view of the separation of potentials, the feedback voltage is advantageously acquired in an additional output circuit that is connected to an additional winding of the transformer or is connected to an additional winding of a storage inductor of the output side. A decoupling diode guarantees that the control input of the further device for current limitation is decoupled from the output of the voltage regulator.

According to another feature and development of the invention, the clock-control frequency converter is particularly characterized in that the further device for current limitation contains a voltage-controlled oscillator and a series circuit of two current branches is connected to the control input of the oscillator, one of the current branches being composed of a fixed resistor and the other being composed of a fixed resistor having a controllable resistor in the form of a transistor arranged in parallel thereto. In this manner, an advantageous operative range of the further device for current limitation is defined with structure that can be realized in a simple manner.

In combination with a control of the second device with the output DC voltage of a load circuit, structure is provided in the clock-control frequency converter in which a controllable resistor is controllable via an optocoupler by the output DC voltage of a load circuit. This provides a separation of potentials on the basis of the optocoupler.

In accordance with further features and developments of the invention, the converter is particularly characterized in that the further device for current limitation contains an oscillator having a frequency-defining capacitor and in that the frequency-defining capacitor is formed by a fixed capacitor and by at least one auxiliary capacitor connectable parallel thereto with the assistance of a switch in the form of a field-effect transistor. The field-effect transistor is controllable with the assistance of a further field-effect transistor whose drain-source path lies on one of a plurality of branches of a voltage divider which is connected at an auxiliary voltage and whose gate electrode lies at a tap of a further voltage divider which has the output DC voltage applied thereto.

Other features and developments of the invention include, in a clock-control frequency converter of the type set forth above, that the switching transistor of a single-ended or single-phase converter is controllable by a push-pull control component that outputs turn-on pulses of the same polarity in alternation at two control outputs, that one of the control outputs is effective during normal operation of the frequency converter and is deactivated when the output DC voltage controlling the further device for further limitation is lower than a prescribed limit value, that the two control outputs of the push-pull control component respectively lie at reference potential with one pull and are connected to one another via a switch, a field-effect transistor, that is closed during normal operation of the frequency converter and is open when one control output is deactivated, that the two control outputs have their one terminal connected directly to one another with one pull and in that the other terminal at the one control output is directly connected to a reference potential and is conducted to reference potential at the other control output via a switch, again a field-effect transistor, that is closed during normal operation of the frequency converter and is open when a control output is deactivated.

These latter improvements are directed to further advantageous developments of the invention in which a single-ended converter is controlled by a push-pull control component and a halving of the switching frequency is achieved with simple techniques.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 5 is an arrangement having a control component whose frequency is variable with a variable capacitor; and FIGS. 6 and 7 illustrate arrangements having a push-pull control component whose one output can be selectively deactivated.

DESCRIPTION OF THE PREFERRED EMBODIMENTS

Figure 1:
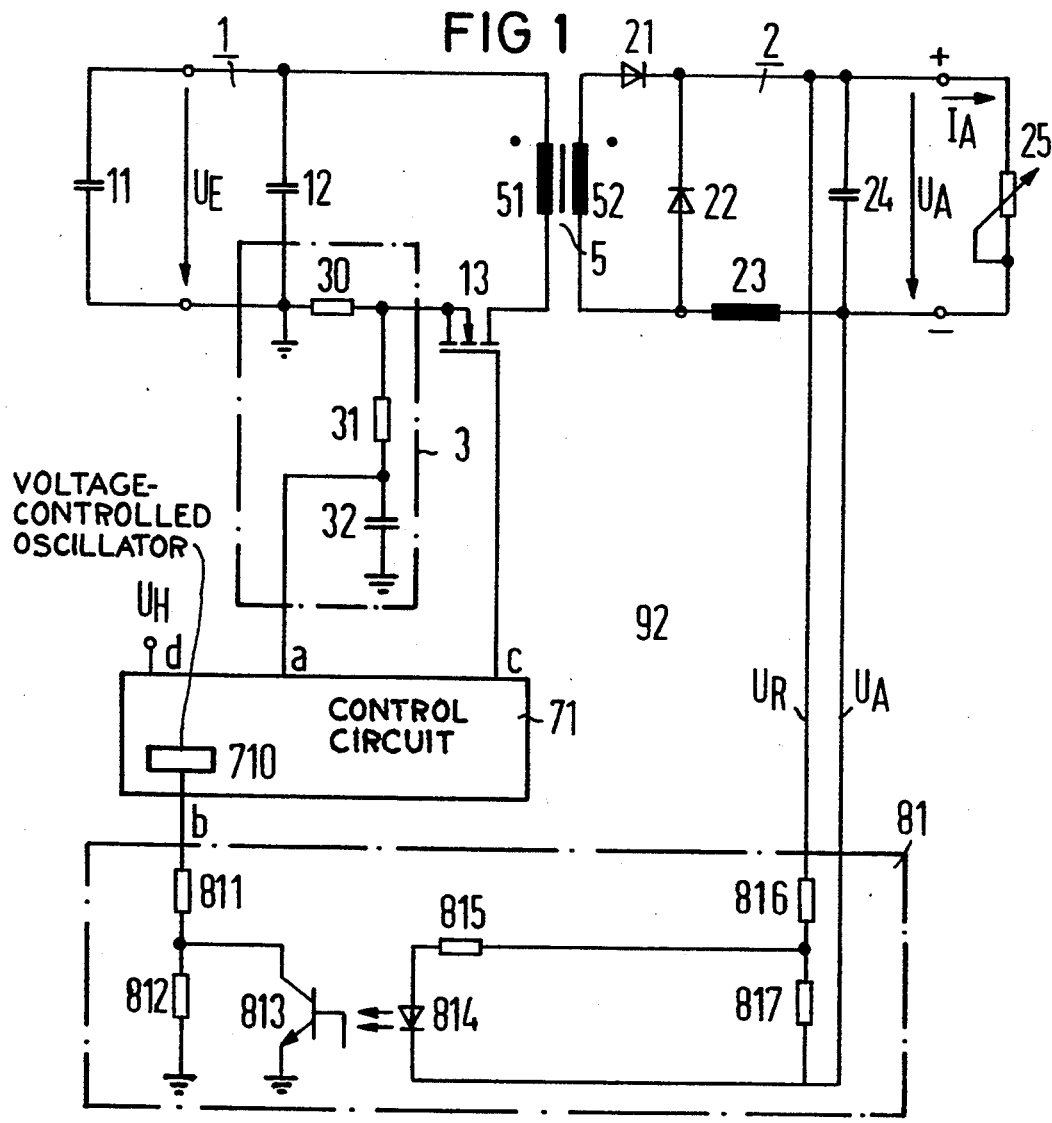
FIG. 1 is a schematic representation of a converter whose switching frequency is controllable with the output voltage via an output coupler in that the frequency-defining resistor of a control component is varied.

Referring to FIG. 1, a forward frequency converter is illustrated in which a capacitor 12 is connected at the input and a capacitor 24 is connected at the output. The capacitor 12 is supplied with the input voltage $U_E$ from a DC voltage source 11. A series circuit composed of a primary winding 51 on a transformer 5, the drain-source path of a field-effect transistor 13 and of an ammeter resistor 30 is connected to the capacitor 12.

A variable load resistor 25 that can assume values of resistance between 0 and $\infty$ is connected to the secondary winding 52 of the transformer 5 via a rectifier diode 21. The secondary circuit of the auto converter, proceeding from the secondary winding 52, thereby contains the rectifier diode 21 in a series arm, a free wheeling diode 22 in a shunt arm following thereupon, an inductor 23 and a further series arm and the capacitor 24 in a shunt arm arranged parallel to the load resistor 25.

The field-effect transistor 13 has its control electrode connected to the control output c of a control circuit 71.

The aremeter resistor 30 is connected to a reference potential on the side of the input voltage source 11. The series circuit composed of the resistor 31 and the capacitor 32 lies between the other terminal of the aremeter resistor 30 and the reference potential. The junction of the resistor 31 with the capacitor 32 is connected to the control input a of the control circuit 71.

The supply voltage input d of the control circuit 71 is supplied with an auxiliary voltage $U_H$ from an auxiliary voltage source (not shown).

The control circuit 71 contains the voltage-controlled oscillator 710. A series circuit of two current branches is connected to the control input b of the voltage-controlled oscillator 710, one of these current branches being composed of a fixed resistor 811 and the other being composed of a further fixed resistor 812 having a controllable resistor arranged parallel thereto and formed by the collector-emitter path of a bipolar transistor 813.

The transistor 813 is a component of an optocoupler 813, 814 and is controlled by the output voltage $U_A$ of the converter on the basis of a diode 814 of the optocoupler 813, 814. To this end, the voltage divider composed of the resistors 816 and 817 is arranged parallel to the capacitor 24. The series circuit composed of the resistor 815 and of the light-emitting diode (LED) 814 of the optocoupler lies parallel to the resistor 817 of the voltage divider.

The clock-controlled converter of FIG. 1 is supplied with the input voltage $U_E$ of the DC voltage source 11. The field-effect transistor 13 is alternatively activated and deactivated by turn-on pulses of the control circuit 71 in the timing of the switching frequency. The apparatus 3 serves the purpose of current limitation by current-dependent, chronological shortening of the turn-on pulses.

The further current limitation device 81 is effective in an upper range of the current to be limited. The control circuit 71 is controlled with the assistance of the further current limitation device, dependent on the output voltage $U_A$, that forms a criterion for the current to be limited. The switching frequency with which the turn-on pulses follow one another thereby becomes lower with a decreasing output voltage, i.e. with a rising output current.

The change of the working frequency results on the basis of a variation of the frequency-defining resistors 811, 812. This frequency-defining resistance is composed of a basic value and of a high-impedance auxiliary value referred to as the basic value. The basic value is formed by the resistor 811; the auxiliary value is formed by the resistor 812. A minimum switching frequency $f_{min}$ is defined by the series circuit of the resistors 811 and 812. The resistor 812 is shunted by the transistor 813. In this manner, the switching frequency of the converter is continuously varied between a minimum value $f_{min}$ and a nominal frequency $f_o$. To this end, the transistor 813 is continuously controlled from the inhibited condition into the fully-conductive condition.

A significant rise of the output current $I_A$ beyond the first limit value is reliably prevented in this manner, whereby no disturbing side effects whatsoever occur.

Figure 2:
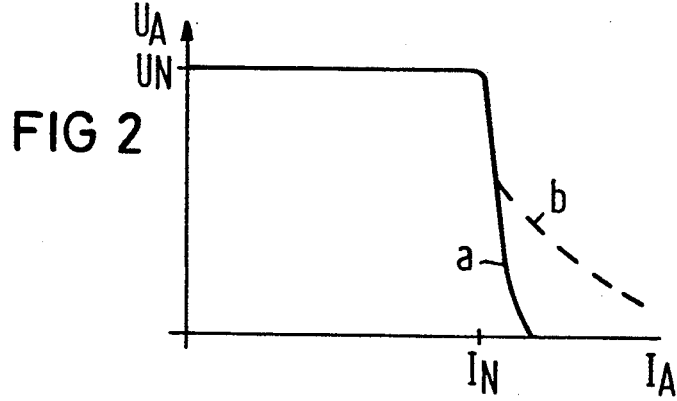
FIG. 2 is a voltage-current diagram for two different types of current limitation.

Referring to FIG. 2, the output voltage $U_A$ serves the purpose of varying the frequency-defining value. A galvanic separation of output and input circuits is realized with the assistance of the optocoupler. When no galvanic separation is required, then the optocoupler can be potentially replaced by a transistor.

In the curve b of FIG. 2, the output voltage for that case in which only one device for the current limitation being active is illustrated and no reduction of the switching frequency occurs. When the output current $I_A$ exceeds its nominal value $I_N$, the output voltage first drops steeply. Due to the minimum on time of the switching transistor that cannot be reduced farther, the curve b merges into a region of lesser steepness. The current limitation is therefore only effective within limitations.

Due to the further limitation device, the switching frequency is reduced, given a value of the output voltage $U_A$ that lies somewhat over the bend that the curve b exhibits. The steep drop of the output voltage therefore continues up to comparatively-low values of the output voltage $U_A$.

When, for example, the nominal value $U_N$ of the output voltage $U_A$ amounts to 5 volts, then the output voltage is reduced to approximately 3.5 volts with the assistance of the one current limitation device in the short-circuit case. Given output voltages that are lower than 3.5 volts, the device for further current limitation becomes effective. With increasing output current $I_A$ of the converter, the output voltage $U_A$ drops. The current in the light-emitting diode 814 of the optocoupler likewise drops. The transistor 813 of the optocoupler attains a more-impedance state. A larger resistor is connected in series with the fixed resistor 811 and the oscillator 710 supplies a lower switching frequency.

Figure 3:
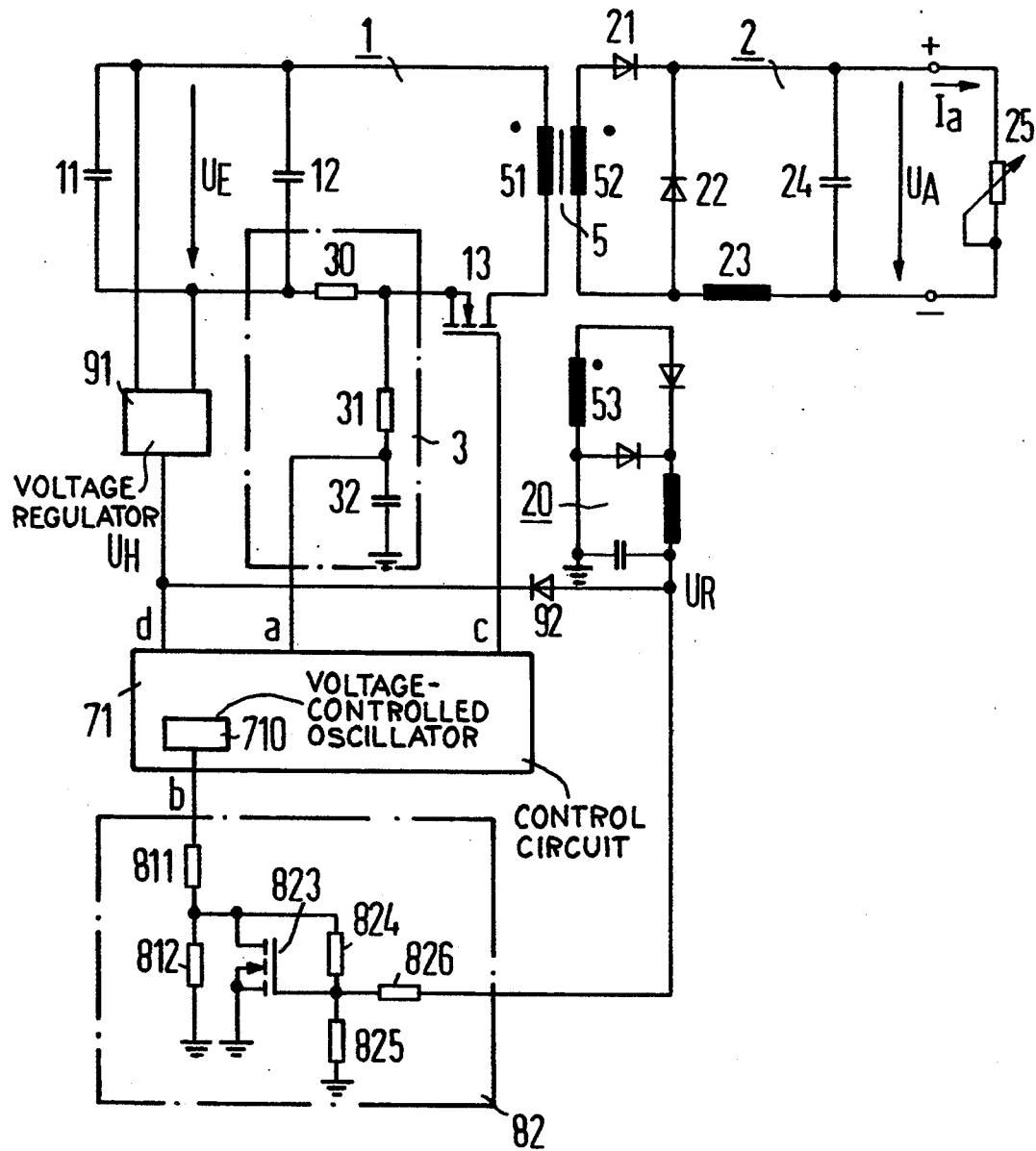
FIG. 3 is a schematic circuit diagram of a converter whose switching frequency can be controlled with a feedback voltage.

The converter illustrated in FIG. 3 differs from that of FIG. 1 in that a feedback voltage $U_R$ serves as an auxiliary voltage $U_H$ and in that the further current limitation device 82 contains a field-effect transistor 823 as a controllable resistor that is controlled by the feedback voltage $U_R$. The feedback voltage $U_R$, lies at the series circuit of a pair of resistors 826 and 825. The control electrode of the field-effect transistor 823 lies at the junction of the resistors 825 and 826. The field-effect transistor 823 has its source-drain path lying parallel to the resistor 812. The resistor 824 lies between the drain electrode and the control electrode of the field-effect transistor 823.

The control circuit 71 is supplied both from the input voltage $U_E$ of the converter via a voltage regulator 91 serving as an auxiliary voltage regulator, as well as with a feedback voltage $U_R$ via a decoupling diode 92. The feedback voltage $U_R$ is acquired by rectification and filtering of the voltage in the auxiliary output circuit 20 appearing at the further secondary winding 53 of the transformer 5, this auxiliary output circuit 20 being constructed as the output circuit 2 and guaranteeing a separation of potentials, realized in FIG. 1 with an optocoupler.

The feedback voltage $U_R$ represents a good image of the output voltage $U_A$. In the case of current limitation, the output voltage drops, as does the feedback voltage in the same direction together. Also in the case of current limitation, the decoupling diode 92 is inhibited. This prevents the current limitation from being negatively affected by the voltage regulator 91.

The voltage regulator 91 is a pre-regulator that is preferably constructed as a loss regulator or, respectively, series regulator, or what is referred to as a linear regulator and that is disengaged in normal operation by the voltage $U_R$.

The frequency of the oscillator 710, i.e. the switching frequency of the converter, is continuously reduced with the assistance of the field-effect transistor 823, as shown as the feedback voltage drops.

Discrete logic circuits or integrated circuit (IC) control components having variable frequency oscillators (VCO's), particularly the control known as the IC TDA 4718, can be employed as the control circuit 710 in the converters of FIGS. 1 and 3.

The field-effect transistor 823 can be potentially replaced by a bipolar transistor, by an optocoupler transistor or by an operational amplifier. A relay can be employed when the frequency is to be diminished by a fixed amount.

Figure 4:
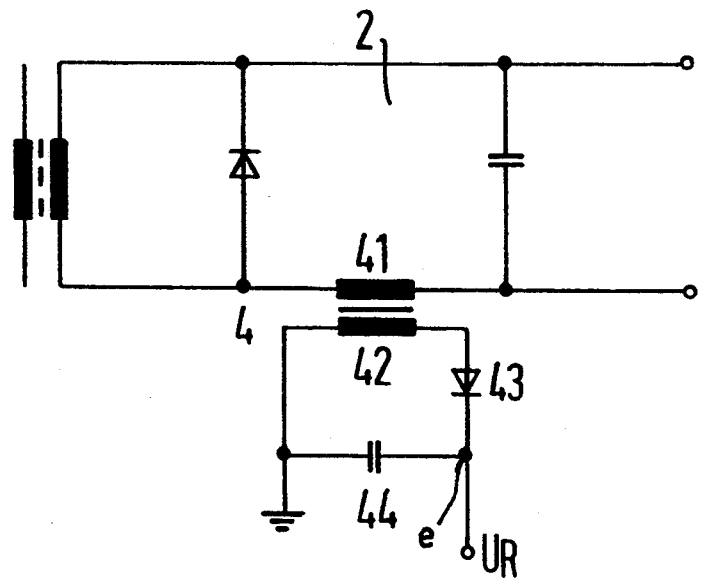
FIG. 4 is a schematic representation of an arrangement for generating a feedback voltage.

FIG. 4 illustrates an alternative solution for the additional output circuit and for the separation of potentials achieved therewith. An inductor 4 that has its primary winding 41 lying in the primary circuit 2 as an inductor is inserted here in the output side primary circuit of the converter of FIG. 1 instead of the inductor 23. A series circuit of the diode 43 and the capacitor 44 is connected to the secondary winding 42. The feedback voltage $U_R$ is applied to the capacitor 44 and, therefore, between the terminal e and ground.

Figure 5:
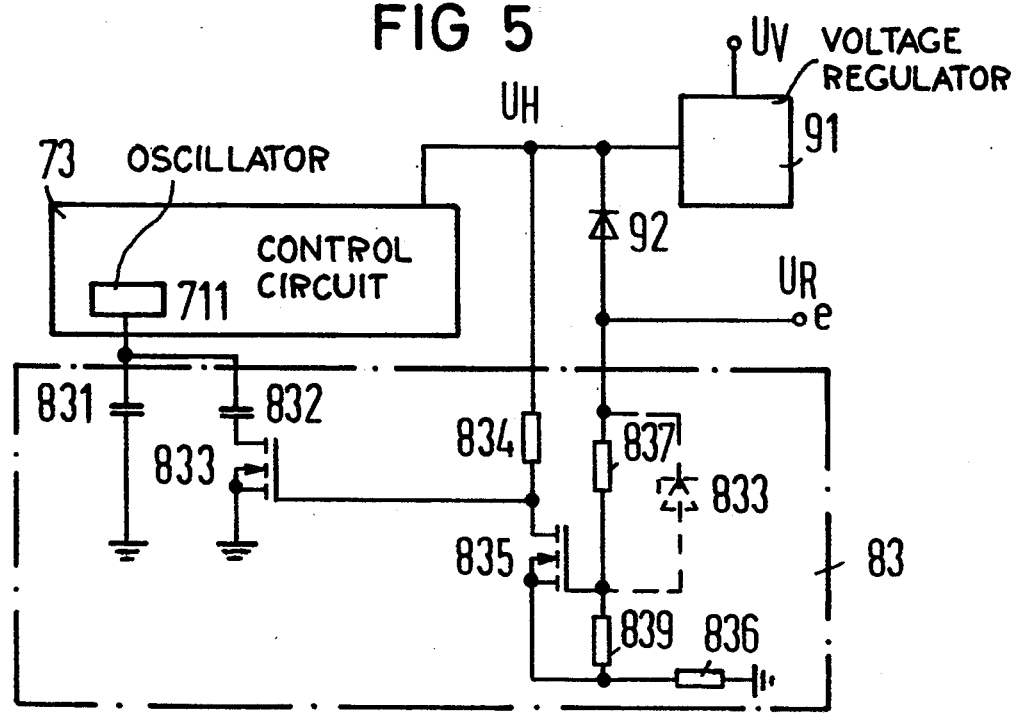
FIGS. 5–7 illustrate circuit modifications of the converter of FIG. 1 in which, in particular.

In the arrangement of FIG. 5, the further current limitation device contains an oscillator 711 that is provided with a frequency-defining capacitor. The frequency-defining capacitor is formed by a fixed capacitor 831 and by an auxiliary capacitor 832 that can be switched in parallel thereto with the assistance of a switch. Further auxiliary capacitors that can be respectively switched in via separate switches can potentially be provided.

The switches formed by a field-effect transistor 833 that is controlled with the assistance of a further field-effect transistor 835. The source-drain path of the field-effect transistor 835 lies in one of three branches of a voltage divider which is connected to the auxiliary voltage $U_H$. A resistor 834, the drain-source path of the field-effect transistor 835 and a resistor 836 are connected in series with one another in this voltage divider.

The gate electrode of the field-effect transistor 835 lies at the top of a further voltage divider that lies between the connection of the source electrode of the field-effect transistor 835 and the resistor 836, on the one hand, and the terminal e for the feedback voltage $U_R$, on the other hand. The further voltage divider is charged with the feedback voltage $U_R$ and is composed of the resistors 837 and 839. The diode 838 is polarized in the non-conducting direction for the feedback voltage $U_R$, or a diode polarized in the conducting direction for the feedback voltage can replace the resistor 837.

In the converter of FIG. 5, the operating frequency is not continuously diminished, but is diminished by a fixed amount by varying the frequency-defining capacitor, in that the auxiliary capacitor 832 is added. The MOSFET 833 serves as a switch element and the feedback voltage $U_R$ serves as a trigger criterion for the cut-in of the capacitor 832.

In particular, the IC control module TDA 4718 mentioned above, can serve as the control circuit 73.

Figure 6:
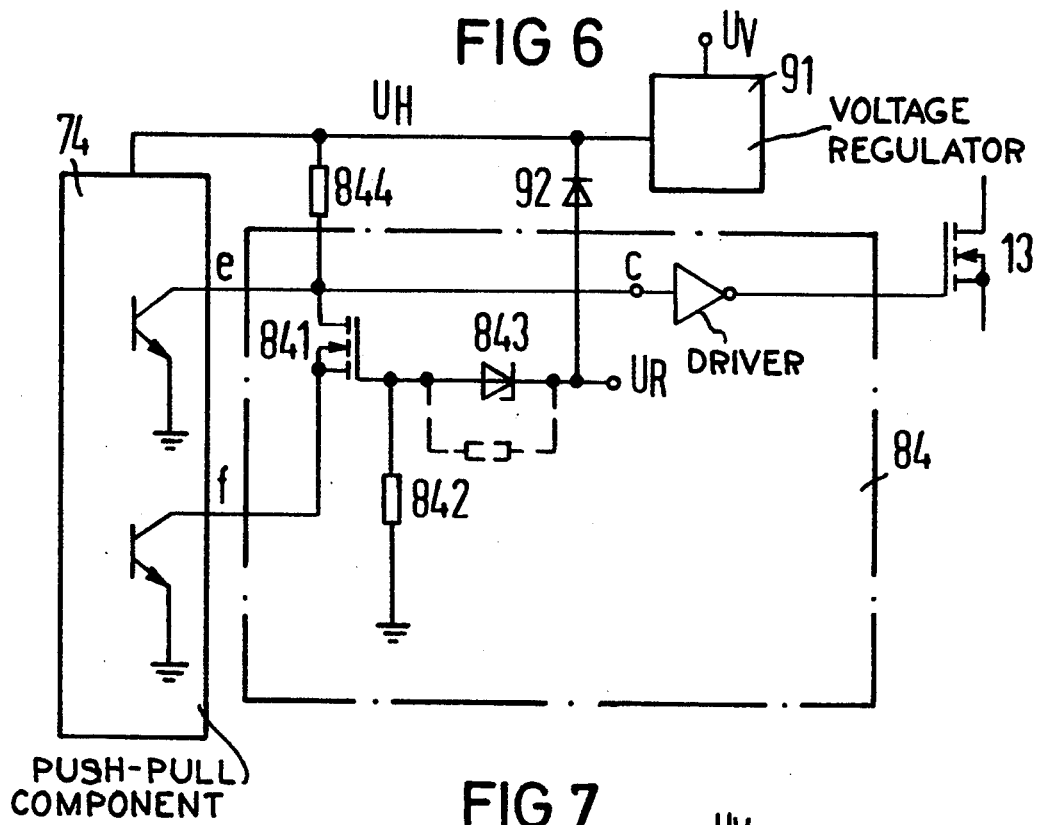
Figure 7:
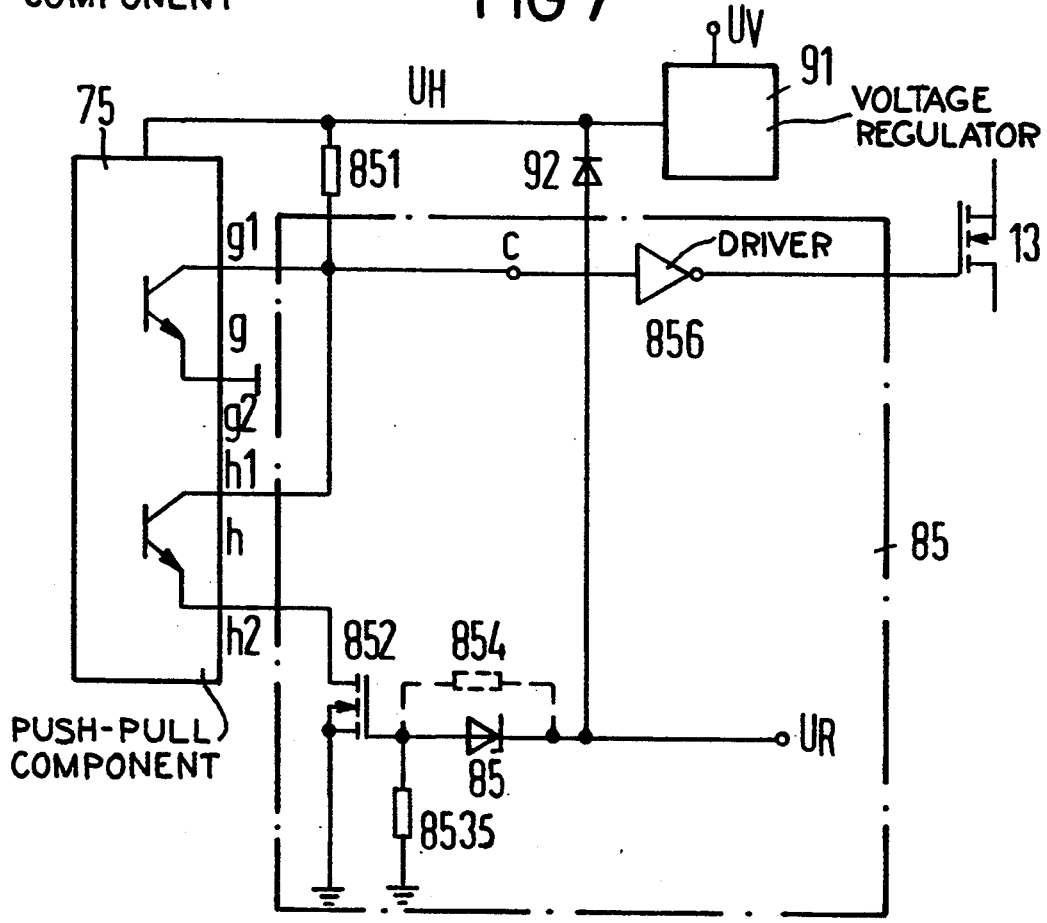

In the converters of FIGS. 6 and 7, the switching transistor 13 of a single-ended converter is respectively controlled by a push-pull control component 74 or, respectively, 75 and outputs turn-on pulses of the same polarity to the control outputs e and f, respectively, g1 and h1, respectively. The control output f or, respectively, h is effective during normal operation of the converter and is deactivated given values of the feedback voltage $U_R$ below a prescribed limit value. In this manner, halving of the switch frequency can be undertaken with simple means. In normal operation, the two output transistors of the control components 74 or, respectively, 75 are connected in parallel. For frequency halving, one of the two parallel outputs is disconnected.

These embodiments are particularly advantageous when a push-pull control component is already employed for a single-ended converter.

In the converter of FIG. 6, each of the two control outputs e, f of the push-pull control component 74 respectively lie at the emitter-collector path of a transistor. The emitters of these two transistors are internally connected to a reference potential with one pull. The collectors of the two transistors are connected to one another via the field-effect transistor 841. The field-effect transistor 841 forms a switch that is closed during normal operation of the converter and is opened below a prescribed limit value of the feedback voltage $U_R$. Its control electrode is connected to the feedback voltage $U_R$ via the Zener diode 843 polarized in the non-conducting direction for the feedback voltage $U_R$ and connected to ground via a resistor 842. The drain electrode is connected via a resistor 844 to the auxiliary voltage $U_H$. A resistor can potentially replace the Zener diode 843.

In the arrangement of FIG. 7, the two control inputs g and h each likewise respectively lie at the emitter-collector path of a transistor. The collectors of these two transistors are externally connected directly to one another and are connected via a resistor 851 to the auxiliary voltage $U_H$ and via a driver 856 to the control electrode of a switching transistor 13. The emitter of the appertaining transistor at the one control output g is connected directly to the reference potential and is connected to a reference potential via the field-effect transistor 852 at the other control outputs h, this field-effect transistor 852 being activatable and deactivatable dependent on the feedback voltage and, therefore, dependent on the current to be limited.

The source electrode of the field-effect transistor 852 is connected directly to ground. The control electrode is connected to ground via a resistor 853 and is connected to the feedback voltage $U_R$ via a Zener diode 855 polarized in the non-conducting direction for the feedback voltage $U_R$. A resistor 854 can replace the Zener diode 855.

In the converter of FIG. 6, the IC control component TDA 4718 particularly serves as a control circuit and the IC control component UE 3524 serves as a control circuit in the converter of FIG. 7.

The type of current limitation set forth with reference to a forward frequency converter can also be correspondingly employed in other clocked power supplies, particularly in push-pull converters.

Converters of the type disclosed herein can be particularly advantageously employed in clocked commercially-operated devices and battery-operated devices, particularly in devices having a variable, disturbance-sensitive load, and particularly in devices having output voltages above 5 volts. The input voltage, for example, can amount to 300 volts, the output voltage $U_A$ can amount to 80 volts and the supply voltage $U_H$ of the control circuit can amount to 10 volts.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A clock-controlled frequency converter comprising:
    a transformer having an input for receiving an input voltage from a DC voltage source and an output at which is generated an output signal;
    a control circuit having a clock;

at least one transistor connected between said DC voltage source and said transformer input and to said control circuit, said transistor being controlled by turn-on pulses from the control circuit in accordance with a switching frequency established by said clock;

a first device for limiting current on the basis of a current-dependent chronological shortening of turn-on pulses, said first device being coupled between said control circuit and said input of said transformer, said first device being configured to detect a current at said input and to cause said control circuit to shorten said turn-on pulses as said detected current increases; and a second device for limiting current, said second device being coupled between said output and said control circuit, said second device configured to detect a DC voltage at said output related to an output current of said output signal and to cause said control circuit to reduce said switching frequency of the turn-on pulses with increasing output current, said second device reducing said switching frequency when the output current exceeds a prescribed limit or said DC voltage falls below a prescribed limit.

2. The clock-controlled frequency converter of claim 1, wherein:

said frequency converter is a DC-DC converter, and said second device includes means for providing a current limitation which is an image of the output DC voltage.

3. The clock-controlled frequency converter of claim 1, and further comprising:

a voltage regulator connected to receive the input voltage and connected to feed the regulated voltage to said control circuit; and a diode for decoupling connected between said output and said control circuit to provide a feedback voltage for said second current limitation device.

4. The clock-controlled converter of claim 3, wherein:

said second current limitation device comprises a voltage-controlled oscillator; and a control for said voltage-controlled oscillator comprises two branches, a first of said branches comprising a fixed resistance and a second of said branches connected in parallel to said first branch and comprising a variable resistance connected to and controlled by said output of said converter.

5. The clock-controlled frequency converter of claim 4, wherein:

said control comprises an optocoupler connected to said output including an optically-coupled transistor in said second branch.

6. The clock-controlled frequency converter of claim 3, wherein:

said second device for current limitation comprises an oscillator including a frequency-defining capacitor, said frequency-defining capacitor including a fixed capacitor and a switch and a variable capacitor connected in parallel thereto by said switch, said switch connected to and operated by said control circuit.

7. The clock-controlled frequency converter of claim 6, wherein:

said switch is a field-effect transistor included in a voltage divider and including a source-drain path in said voltage divider, a second voltage divider connected to said output and including a tap, said transistor including a gate connected to said tap.

8. The clock-controlled frequency converter of claim 3, wherein:

said frequency converter comprises a push-pull component connected to provide turn-on pulses of the same polarity in alternation at two outputs, wherein one of the control outputs is effective during normal operation of the frequency converter and is deactivated when the other output DC voltage controlling the second device for current limitation is lower than a prescribed limit value.

9. The clock-controlled frequency converter according to claim 8, wherein:

said two control outputs respectively lie at a reference potential with one pull and are connected to one another via a switch that is closed during normal operation of the frequency converter and is opened when one control output is deactivated.

10. The clock-controlled frequency converter according to claim 8, wherein:

said two control outputs each have one terminal connected directly to one another with one pull; and at the other terminal the one control output is directly connected to reference potential and is connected to reference potential at the other control output via said switch that is closed during normal operation of the frequency converter and is opened when said one control output is deactivated.

11. A clock controlled frequency converter, comprising:

a transformer having an input and an output;

an electronic switch coupled to said transformer input to control current thereto;

a control circuit having a clock and being coupled to said electronic switch to control actuation of said switch by emitting turn-on signals at a frequency established by said clock, each turn-on signal turning on said switch for an on time established by the duration of such turn-on signal;

a first circuit coupled between said transformer input and said control circuit and configured to cause said control circuit to vary on times of said switch according to a current detected at said input, said on times being reduced as said detected current increases; and a second circuit coupled between said transformer output and said control circuit, said second circuit configured to detect a current at said output and to cause said clock to decrease said clock frequency as said current detected at said output increases above a prescribed limit or a voltage at said output falls below a prescribed limit, thereby to cause, in turn, said current detected at said output to decrease.

* * * * *